V. R. WILL.
DIRECTION SIGNAL FOR MOTOR VEHICLES.
APPLICATION FILED MAR. 8, 1920.
1,420,299.
Patented June 20, 1922.
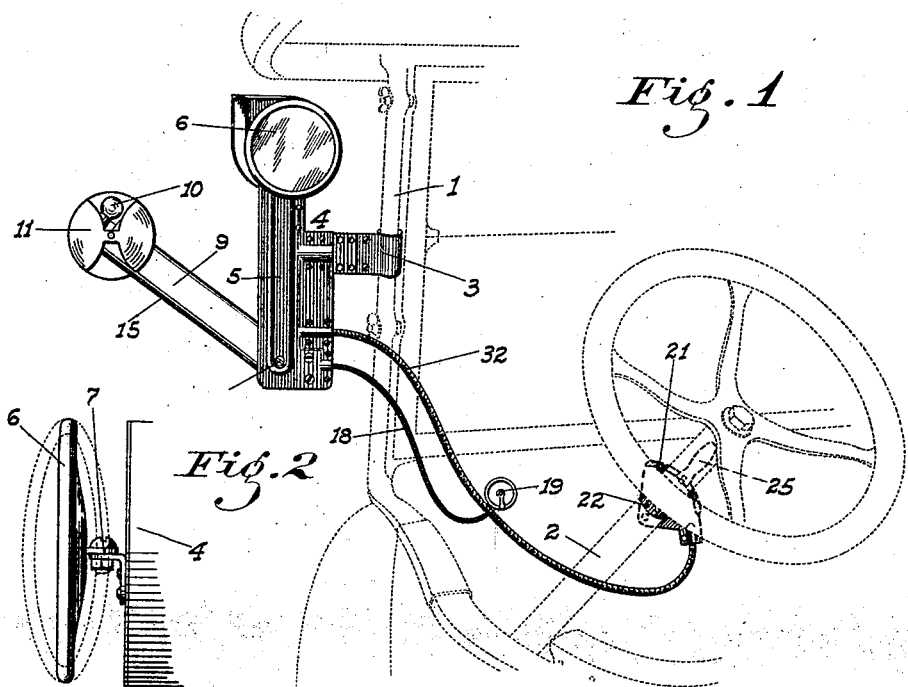
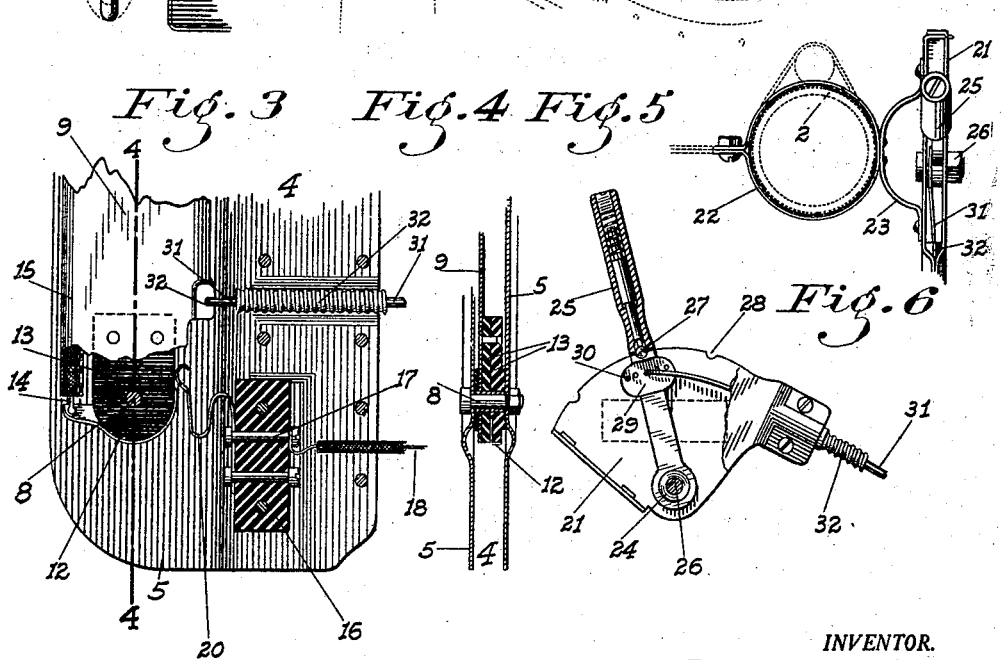
INVENTOR.
Victor R. Will
BY
ATTORNEY

UNITED STATES PATENT OFFICE.

VICTOR R. WILL, OF LODI, CALIFORNIA, ASSIGNOR TO P-A-T-S MANUFACTURING COMPANY, OF LODI, CALIFORNIA.

DIRECTION SIGNAL FOR MOTOR VEHICLES.

1,420,299.  Specification of Letters Patent.  Patented June 20, 1922.

Application filed March 8, 1920. Serial No. 363,966.

*To all whom it may concern:*

Be it known that I, VICTOR R. WILL, a citizen of the United States, residing at Lodi, in the county of San Joaquin, State of California, have invented certain new and useful Improvements in Direction Signals for Motor Vehicles; and I do declare the following to be a full, clear, and exact description of the same, reference being had to the accompanying drawings, and to the characters of reference marked thereon, which form a part of this application.

This invention relates to improvements in direction signals for motor vehicles of all kinds, the principal object being to provide a signal device visible as well by night as by day, and which may be extended to any one of a number of positions; and to provide means actuated by the driver of the vehicle, for so positioning and holding the signal member at will.

Another object is to so construct the signal member relative to the actuating means, that while the two form a co-operating unit, they are separate members permitting a certain freedom of movement of the one relative to the other, so that the device is adapted to be mounted to any size and make of vehicle, irrespective of the relative distances between the windshields and steering posts of various vehicles, on which parts the signal member and the actuating means respectively are mounted.

This device is particularly an improvement over the type shown in my Letters Patent No. 1280925, dated the 8th day of October, 1918, having various features of similarity therewith, but being brought up to date in order that it shall conform to the traffic laws of certain States.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a perspective outline of a portion of an automobile, showing my improved signal mounted thereon.

Fig. 2 is a fragmentary side elevation, enlarged, of the top of the signal casing, showing a mirror mounting.

Fig. 3 is a fragmentary rear end view of the lower part of the signal arm and casing, one cover of the latter being removed, and showing the operating and lamp actuating connections.

Fig. 4 is a cross section taken on a line 4—4 of Fig. 3.

Fig. 5 is a sectional elevation of the actuating handle mechanism.

Fig. 6 is a top plan view of the same, showing the method of connecting the same to the steering post of the car.

Referring now more particularly to the characters of reference on the drawings, the numeral 1 denotes the windshield of the vehicle, and 2 the steering post.

Mounted to the former by a suitable clamp 3 is a vertical casing 4, formed substantially of a pair of suitably spaced metal plates 5, riveted or otherwise secured together and being open throughout the height of the casing along the outer edges thereof. On the upper end of the casing on the rear side thereof is mounted a mirror 6, flexibly connected to the casing as at 7 for angular positioning relative to said casing in the transverse plane of the vehicle.

Pivotally mounted in the lower end of the casing as at 8 is a signal arm 9, adapted to be entirely concealed by the casing when at rest. On the upper end of the arm is an electric lamp 10 in front of and behind which and in staggered relative arrangement are rotatable fan or vane members 11 adapted to move across the path of the light and alternately display or conceal the rays of the light.

These vanes may be rotated by a spring, by the wind created by the movement of the vehicle, or by a small electric motor as may be found desirable.

The lamp is lit constantly as soon as the signal arm moves out of the casing by means of a circular contact strip 12, pinched between insulation pieces 13 fixed to the arm about the pivotal point 8 of said arm. The outer end of the strip 12 is connected to a wire 14 leading to the lamp 10 through a hollow tube 15 formed integral with the arm, and which strengthens and braces the same.

Mounted in the casing in an offset plane from the arm is an insulation block 16 having a terminal 17 thereon connected to a wire 18 leading to a source of current through a switch 19 positioned on the dash board of the car. To the terminal 17 is also connected a spring contact strip 20, which when the signal arm is at rest in the casing, bears against the insulation members 13, but when the arm is moved outwardly, will contact with the strip 12, and maintain such contact throughout the movement of the arm, the circuit through the lamp being thus closed, the same being grounded on the car.

The signal arm is actuated by the following mechanism:—

A segmental and double support 21 is adapted to be mounted to the steering post 2 in a vertical plane by means of a suitable clamp 22 fixed to one side of the member 21, this clamp preferably being of a flexible type such as is used on the hose from the radiators of motor cars. The clamp itself is preferably secured to the member 21 by means of a rigid arch 23 therebetween, so that said member will be held away somewhat from the plane of the post 2. Pivoted at the apex of the support 21 on a spacer sleeve or bushing 24 therein is a handle 25, said bushing having a bolt 26 passing therethrough to hold the handle in place.

The handle 25 of course projects beyond the support 21 a suitable distance, and has therein a spring pressed bar or dog 27 adapted to engage recesses 28 cut in the peripheral edges of the member 21, there being as many of such recesses as there may be different positions or angles of setting of the signal arm 9.

To the handle 25 is fixed or formed integral therewith a small plate 29 provided with a plurality of closely spaced holes 30 radial from the pivotal mounting of the handle, in any of which holes is held one end of a strong wire 31, which extends to the arm 9 and is connected to the inner end thereof as at 32 at a point a suitable distance above the pivotal connection 8 when said arm is in a vertical position.

The wire is enclosed in a substantial flexible metal tube 33, in which it fits closely so that there is no chance for the same to buckle, this tube being clamped at its ends to the casing 4 and handle support 21.

By this connection, the handle member may be positioned at any point relative to the signal member within the limits of the tube, while any pressure or pull on the handle is transmitted directly by the wire 31 to the signal arm, causing the latter to be moved about its pivotal point, the amount of such movement depending on the movement of the handle, and being held in any predetermined position when the handle-dog engages any of the notches 21.

By reason of the holes 30 in the plate 29, the wire 31 may be taken up or let out, in the event that it is found to be too loose or too tight to give proper service.

From the foregoing description it will be readily seen that I have produced such a device as substantially fulfills the object of the invention as set forth herein.

While this specification sets forth in detail the present and preferred construction of the device still in practice such deviations from such detail may be resorted to as do not form a departure from the spirit of the invention, as defined by the appended claim.

Having thus described my invention what I claim as new and useful and desire to secure by Letters Patent is:—

An actuator signal arm comprising a pivoted operating handle, a plate fixed on said handle and positioned in the plane of movement thereof, said plate having a plurality of orifices positioned substantially along a line at right angles to the handle, and a flexible member connected to the arm at one end and terminating at any one of the orifices at the other end.

In testimony whereof I affix my signature.

VICTOR R. WILL.